Patented Jan. 7, 1936

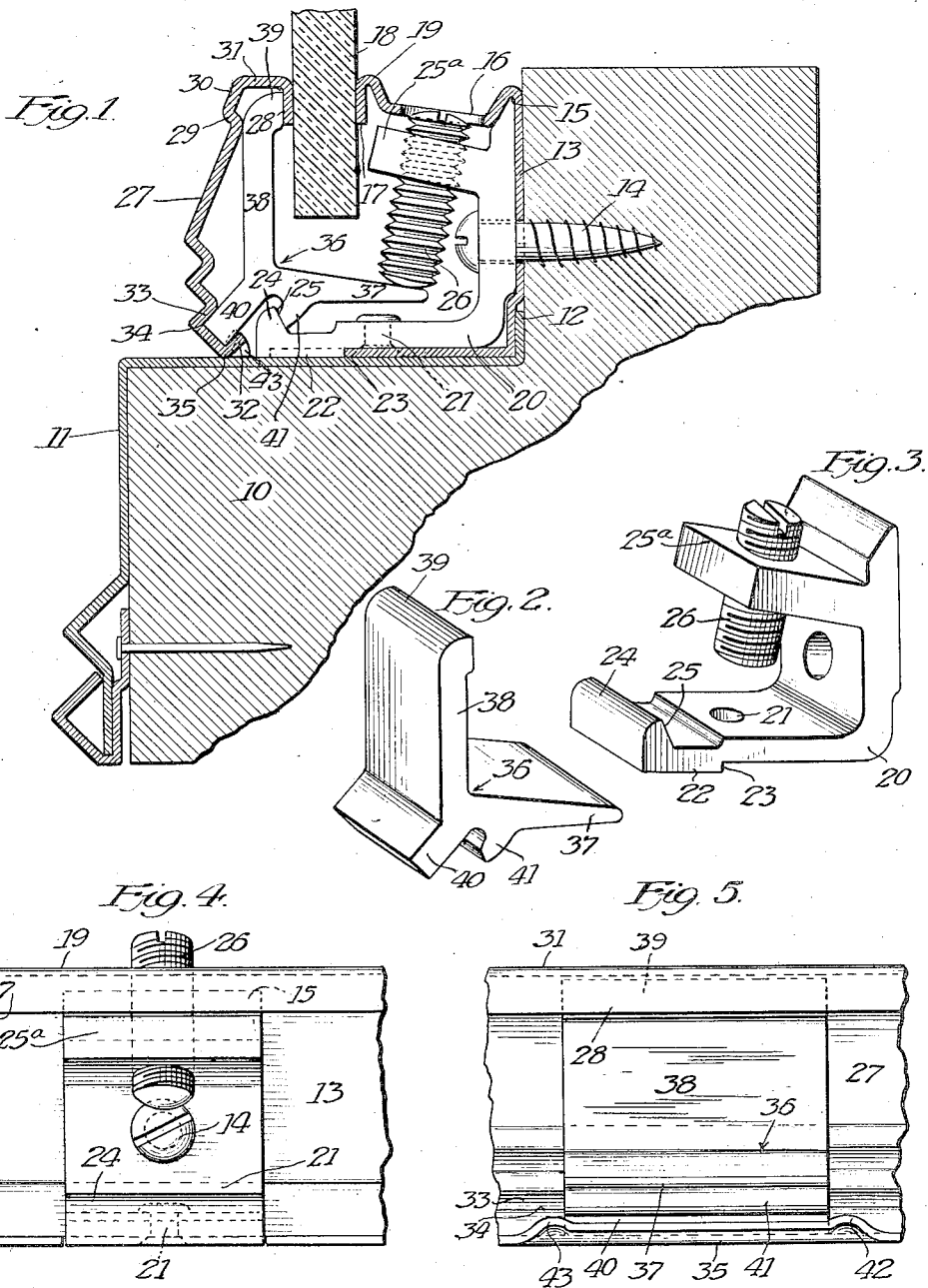

2,027,081

UNITED STATES PATENT OFFICE 2,027,081

STORE FRONT CONSTRUCTION

Purdy E. Attick and John J. Bosshard, Chicago, Ill., assignors to Brasco Manufacturing Company, Harvey, Ill., a corporation of Illinois Application March 19, 1934, Serial No. 716,292

3 Claims. (Cl. 20—56.4)

Our invention relates to a store front construction and has particular reference to a construction in which a pair of glass pane engaging members is provided which are adapted to grip a glass pane along its edge and hold it in position in a store window or the like.

Another object of our invention is the provision of a store front construction in which the outer glass pane engaging member is pivotally positioned along its bottom edge upon the window frame or side of the window casing in such manner that a tight joint is formed, excluding water and the like at this portion of the frame, and also providing for a tight gripping action of the member in holding the glass pane.

Another and further object of our invention is the provision of a store front construction in which the outside anchoring members are placed in position in the outer glass pane engaging member in substantially fixed relation and in position to cooperate with an anchoring member mounted in the inner glass pane engaging member, the two anchoring members being interengaged to prevent the outer glass pane engaging member from moving outward, so that a tight and simple construction is thus formed, this construction being generally similar to the construction shown in our copending application Serial No. 620,740, filed July 5, 1932.

Another and further object of our invention is the provision of a store front construction which is adaptable for the use of glass of varying thicknesses within the range of glass in common use for store fronts, that is, one size is capable of use for all ordinary purposes instead of being capable of use with only one thickness of glass which is a common fault of a large number of these constructions now in use.

Another and further object of our invention is the provision of a store front construction which is securely held together and in which the glass will not become loosened through vibration, wind pressure and the like.

Another and further object of our invention is the provision of anchoring means having faces which are outwardly inclined to allow a slight slippage or adjustment of these faces without having a tendency to move these anchoring members toward the edge of the glass pane.

These and other objects of our invention will be more fully and better understood by reference to the accompanying sheet of drawing, in which—

Figure 1 is a cross sectional view embodying our invention;

Figure 2 is a perspective view showing the lever which is mounted in the outside glass pane engaging member;

Figure 3 is a perspective view of the anchoring member mounted within the inner glass pane engaging member;

Figure 4 is a sectional view on line 3—3 of Figure 1; and

Figure 5 is an elevational view of a section of the glass retaining and anchoring device showing the means employed for holding the anchoring devices in proper spaced relation.

Referring now specifically to the drawing, in which like reference characters refer to like parts throughout, a window frame 10 is shown having a casing member 11 mounted thereover, the casing member having an angularly turned portion 12 at its rear thereof. An inner glass pane engaging member 13 is provided with seats against the member 11 and is secured thereto in any approved manner, as by a screw 14 inserted into the window frame 10. The member 13 also rests against the upturned portion 12 of the member 11 thus forming a support for the member 13 at its back for a partial distance along its side. The member 13 is turned inward on its inner edge in such manner that a channel 15 is formed adjacent its outer wall on the inside of the member 13, with an opening 16 extending through its wall, and its inner edge 17 being turned downward to engage against the inner side of a glass pane 18. The inner portion of the member 13 is bent at 19 and forms, with the portion surrounding the channel 15, cushioning means for gripping the glass pane 18 and in effect an elastic mounting for the glass pane and assists in cushioning wind shocks and the like.

An anchoring member 20 is provided which generally conforms to and is seated against two sides of the member 13 on the inner sides thereof, with a rivet 21 being provided which secures these members together at one side, with the screw 14 holding these members together at the opposite side. The upper end of the member 20 is fitted into the channel 15 and a projecting portion 22 having a shoulder 23 thereon is fitted into a recess formed in the outer edge of the member 20, the projecting portion 22 resting upon the casing member 11. The outer end 24 of the member 20 is upturned and has an outwardly inclined face 25 against which a projecting portion of a lever, hereinafter described, engages for holding the lever in the assembled position. The anchoring member 20 has an inwardly projecting lug portion 25ª within which a screw 26 is positioned for the purpose of operatively engaging the lever, hereinafter described, in the assembled construction. The lug portion 25ᵃ is formed at a slight angle and the screw 26 is inserted therethrough at a right angle to the longitudinal plane of the lug 25ᵃ. The force of the lever against the point of the screw 26 is in a straight line, thereby causing the screw to bind in the lug 25ᵃ and holding the screw against backing or becoming loosened by vibration.

An outer glass pane engaging member 27 is provided having an inwardly turned end 28 adapted to engage the outer surface of the glass pane 18, and has a bead portion formed thereon about a diagonally outwardly extending wall portion 29, a further diagonally extending portion 30, and a straight portion 31 connecting with the inturned portion 28. The lower marginal edge of the member 27 is stepped with the portions thereof extending at approximately right angles to each other and having an inwardly turned end portion 32 which is parallel with one of the stepped portions 33. A channel 34 is formed therein and a pivot point 35 is provided for the member 27 against the casing member 11.

A lever designated as a whole as 36 is provided which consists essentially of three portions, a free end portion 37 adapted to be positioned under the screw 26, an upstanding portion 38 adapted to engage against the inner side of the end portion 28 of the member 27, and an outwardly projecting portion 40. The end 39 of the lever 36 is flat so as to engage against the inwardly turned portion 28 of the member 27. The projecting portion 40 is located substantially at the apex of the lever 36 and extends into the channel 34 formed between the portions 33 and 35 of the member 27, and is anchored in this channel against easy displacement and forms with the point 35 a rocking point upon which the lever 36 pivots. A projection 41 is formed on the lever 36 for engagement with the upturned end 24 of the anchoring member 20, which prevents the lateral movement of the member 36 and holds the device substantially in position. The projection 41 has an inclined face thereon adapted to seat against the outwardly inclined face 25 of the member 24, so that as the screw 26 is tightening there is a relative movement between the member 24 and 41 and there is no tendency to lift the outer end of the member 20, thus making certain of a tight joint at this point. With the normal variation in thickness of store front glass the pivotal point of the lever is always about the pivot point 35 so that the pivotal point of the member 27 at 35 is held tightly in position against this member and forms a tight joint between these two members.

In formation the members 13 and 27 may be rolled or of the extruded design, and have the anchoring members 20 fitted therein so that they will not need to be moved by the workmen in setting a glass pane. The member 27 has the lever 36 placed therein in such position that the end 37 of the lever is under the screw 26 when the construction is placed in a store front so that in assembling the structure it is necessary to place the pane of glass 18 against the member 13 and the member 27 is thereupon fitted against the outer section of the glass pane and the screws 26 tightened. This brings the portion 28 of the member 27 up against the glass pane 18 and tightly clamps the glass pane between the portion 17 of the member 13 and the portion 28 of the member 27. In placing the members 38 in the outer sash member 27 it is necessary to space these members so they coact with the members 20. The lower edge of the member 27 is crimped inward at 42 and 43, thus preventing the members 38 from sliding away from their predetermined positions. As the screw 26 is turned down to tighten the sash holding members on the pane 18 the outward force will tend to force the anchoring member downward, thus tending to preserve a tight joint under the anchoring member.

We have found in practice that as the screw 26 is tightened the downward force of the screw exerted upon the lever forces the lever downward and with it the outer pane engaging member, and then the lever with the pane engaging member rocks inward, gripping the glass pane tightly, but providing a tight joint between the outer pane engaging member and the window casing.

It is understood of course that the members 13 and 27 are made in suitable lengths to fit a variety of sizes of windows, with the anchoring members spaced therein a suitable distance to provide a store front construction of adequate strength to hold the glass pane 18 in position.

While we have described more or less precisely the details of construction, we do not wish to be understood as limiting ourselves thereto, as we contemplate changes in form and the proportion of parts and the substitution of equivalents as circumstances may suggest or render expedient without departing from the spirit or scope of our invention.

We claim:

1. A store front construction, comprising in combination a fixed inner glass pane engaging member, an anchoring member having a projecting end portion mounted therein, having an outwardly inclined face, an outer movable glass pane engaging member having a channel formed therein along its base, a lever having a portion thereof in said channel and having a projection thereon adapted to engage said anchoring member, the engaging portion of said projection having a face parallel with the inclined face on the anchoring member, and means whereby said lever is actuated.

2. A store front construction, comprising in combination a fixed inner glass pane engaging member, an anchoring member having a projecting end portion mounted therein having an outwardly inclined inner face, an outer movable glass pane engaging member having a channel formed therein along its base, a lever having a portion thereof in said channel and having a projection thereon adapted to engage said anchoring member, the said projection having an inclined face adapted to slidably engage the inclined face of said anchoring member, and means whereby said lever is actuated.

3. A store front construction, comprising in combination a fixed inner glass pane engaging member, an anchoring member having a projecting end portion mounted therein having an outwardly inclined inner face, an outer movable glass pane engaging member having a channel formed therein along its base, a lever having a portion thereof in said channel and having a projection thereon adapted to engage said anchoring member, the said projection having an inclined face adapted to slidably engage the inclined face of said anchoring member, and means whereby said lever is actuated whereby an outward and downward force is applied to said anchoring member.

PURDY E. ATTICK.
JOHN J. BOSSHARD.